Nov. 14, 1950   S. EUZENT   2,530,007
FISHING HOOK SNAPPER
Filed May 6, 1949   2 Sheets-Sheet 1
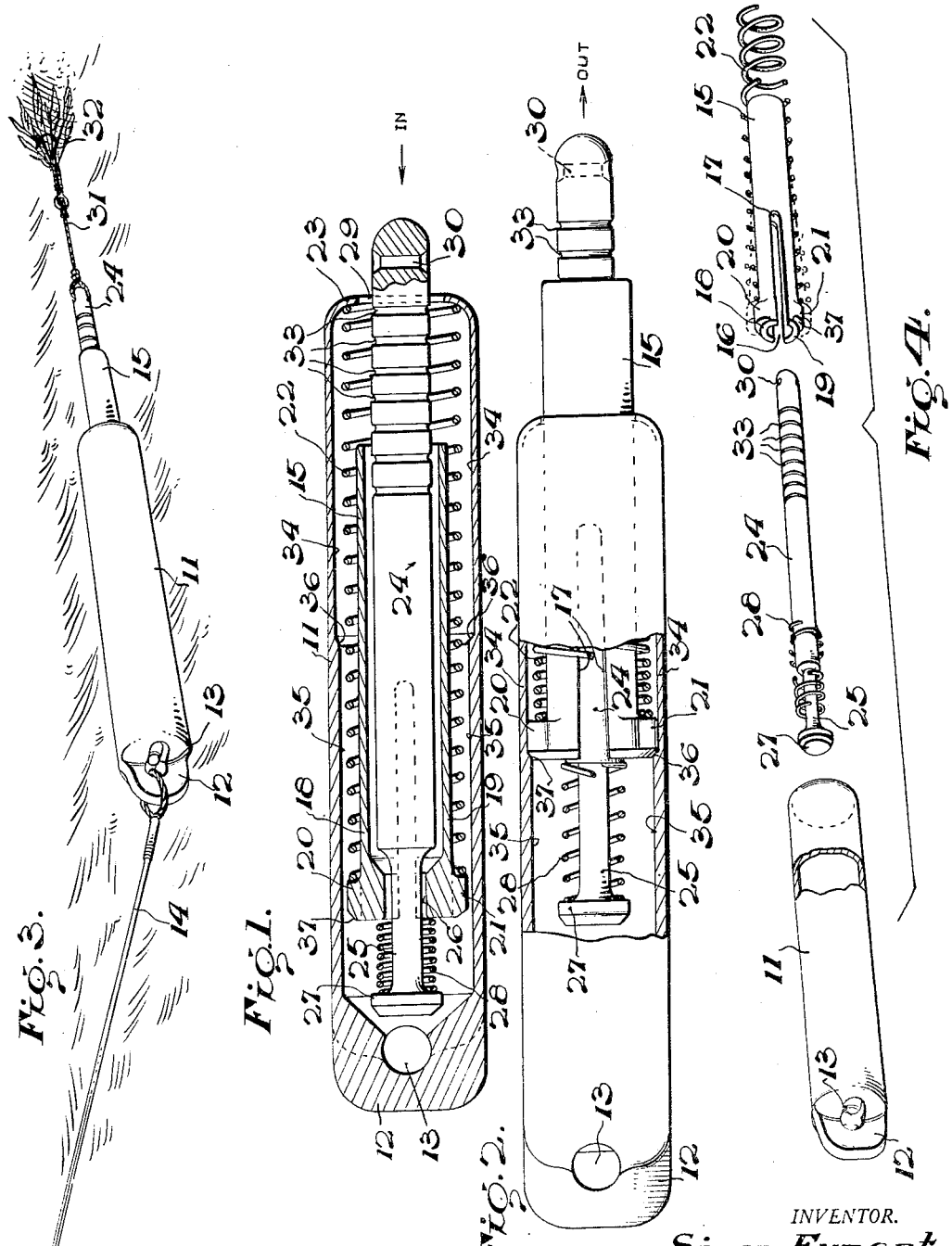
INVENTOR.
Simon Euzent.
BY
Albert J. Kramer
ATTORNEY Nov. 14, 1950 S. EUZENT 2,530,007
FISHING HOOK SNAPPER
Filed May 6, 1949 2 Sheets-Sheet 2
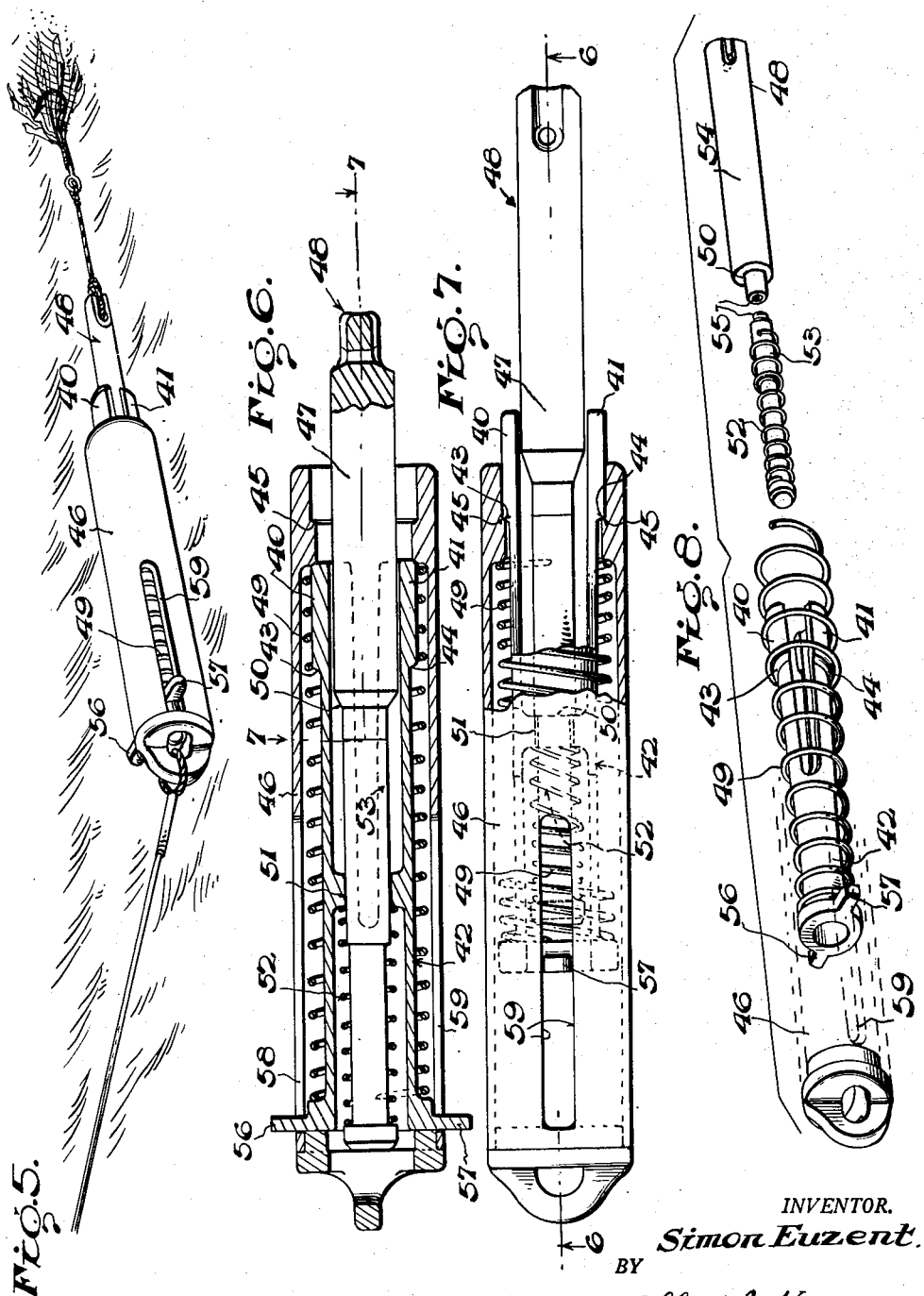
INVENTOR.
Simon Euzent,
BY
Albert J. Kramer
ATTORNEY Patented Nov. 14, 1950

2,530,007

UNITED STATES PATENT OFFICE 2,530,007

FISHING HOOK SNAPPER

Simon Euzent, Baltimore, Md.

Application May 6, 1949, Serial No. 91,801

6 Claims. (Cl. 43—15)

This invention relates to fishing devices and is more particularly concerned with devices for use in catching fish on a hook.

It frequently happens that a fish will grasp the bait on a hook and remove it therefrom without becoming impaled by the hook. One of the reasons for this is that the fisherman cannot manipulate the line quickly enough to impale the fish. This may be due to the naturally slower reflexes of a human being as compared to the fish, or to the slack in the fishing line, or both.

Accordingly, one of the objects of this invention is the provision of a device which will automatically act to impale a fish on a hook when the fish exerts a pull on the line.

Another object of the invention is the provision of such a device which is reliable and quick acting and which does not require for its operation any manipulations on the part of the fisherman.

A further object of the invention is the provision of a device of the type mentioned which is easy to set in operative position and which has only a few moving parts.

A still further object of the invention is the provision of such a device which is small and compact, simple and inexpensive to manufacture and which does not require frequent repairs or replacement of parts.

These and other objects and advantages of the invention will be apparent from the following description considered together with the accompanying drawing, in which drawing:

Fig. 1 is a longitudinal cross sectional view of a preferred embodiment of the invention in tripped position.

Fig. 2 is a side elevational view, partly in section of the same embodiment in its cocked position.

Fig. 3 is an isometric view showing the manner in which the device is attached to a fishing line.

Fig. 4 is an exploded view, partly in section, of the same embodiment.

Figs. 5, 6, 7, and 8 are views similar to Figs. 1, 2, 3, and 4, respectively, of another embodiment of the invention.

Referring with more particularity to the drawing in which like numerals designate like parts, the embodiment illustrated in Figs. 1, 2, 3, and 4 comprises a hollow shell member 11 having a fin extension 12 at its front provided with an eye 13 to which the fishing line 14 is attached.

Within the shell 11, there is co-axially disposed a longitudinal sleeve 15. The front section of the sleeve is split longitudinally by slots 16 and 17 to provide a pair of prong members 18 and 19, diametrically opposed. The front ends of the prong members each carry a semicircular flange 20 and 21, respectively.

The sleeve member 15 is surrounded by a coil spring 22, one end of which bears against the flanges 20 and 21 and the other end bears against the inner rear end 23 of the shell 11, whereby the sleeve member is constantly urged forwardly.

Within the sleeve member 15 there is disposed a plunger 24, the front section of which comprises a shank 25 of reduced diameter and normally is disposed between the flanges 20 and 21 in an aperture 26. Said aperture is also of a reduced section relative to the inside diameter of the sleeve. The front of the shank is provided with a flange 27 and a compression spring 28 is disposed between it and the front of the sleeve 15.

The rearward end of the plunger 24 projects through an aperture 29 at the rear of the shell and is provided with a hole 30 for attaching one end of a leader 31, the other end being fastened to the hook 32. The aperture 29 is large enough to accommodate the diameter of the sleeve 15. A series of spaced annular grooves 33 about the rearward section of the plunger 24 provides a gripping surface for cocking the device.

The rearward section 34 of the inner wall of the shell 11 is of a somewhat larger diameter than the front section 35. The junction of the two sections is tapered to provide an annular seat 36 facing rearwardly. The front of the prongs 18 and 19 are provided with a complementary tapered annular shoulder 37 which is adapted to rest against the seat 36 when the device is in its cocked position.

To cock the device, the plunger is protracted or pulled outward which carries with it the sleeve 15. It is pulled out far enough so that the front end of the sleeve is positioned rearward of the seat 36. The sleeve is then manually held against movement relative to the shell, while the plunger is released. The force of the spring 28 pulls the plunger forwardly until the enlarged part thereof enters the reduced space between the prongs 18 and 19 and forces the ends of the prongs outwardly against the rearward section 34 of the shell wall. The sleeve is then released and the spring 22 forces the front end of the sleeve in contact with the seat 36 where it is held. Should a fish grasp the hook attached to the plunger and exert a rearward pull, the plunger will be moved rearward relative to the sleeve and hence the enlarged part will be removed from the apertur 26, thereby permitting the prongs 18 and 17 to retract free of the seat 36. The spring 22 then forces the sleeve 15 forwardly retracting with it the plunger and hence exerting a direct pull forwardly on the hook 32.

The modified embodiment of Figs. 5, 6, 7, and 8 operates on a similar principle, except that the parts are arranged somewhat differently. In this embodiment, the prongs 40 and 41 are on the rearward end of the sleeve 42 and they are each provided with a forwardly extending shoulder 43 and 44, respectively, at the rearward end to engage the annular seat 45 at the rear end of the shell 46.

In cocked position, the shoulders 43 and 44 engage the seat 45 and are held in this position by the enlarged portion 47 of the plunger 48 as shown in Fig. 7.

When the plunger is pulled rearward by the fish, the prongs are no longer held against the seat, thereby permitting the sleeve spring 49 to retract the sleeve into the shell and carry with it the plunger 48.

A forwardly extending shoulder 50 on the plunger is adapted to engage an annular abutment 51 within the sleeve member to limit forward travel of the plunger relative to the sleeve. The abutment 51 also serves as a bearing surface for one end of the plunger spring 52. The plunger is conveniently made in two sections, 53 and 54, as illustrated, to facilitate assemblying it with the other parts of the device. The parts of the plunger may be held together after assembly in any suitable manner, such as by gluing, welding, or the screw threads 55 illustrated in Fig. 8.

The sleeve member may also be provided with outwardly extending fingers 56 and 57 slidable in slots 58 and 59, respectively, of the shell for the purpose of holding the sleeve in a cocked position manually, while the enlarged end of the plunger is being inserted between the prongs to hold them in that position.

The device may be made of any suitable material, including metals, such as brass, aluminum, etc., but preferred materials comprise plastics. The plastic material may be opaque or transparent, although the latter is preferred since it permits observing the moving parts of the device at all times and detection of any irregularities which may obtain. It should preferably be a non-breakable plastic material and one which is not affected by water, particularly salt water, if the device is to be used in salt water. Polyethylene, for example, is considered a suitable plastic material for this purpose. The material should also be one which provides the prongs of the sleeve member with sufficient resilience to operate in the manner indicated.

Having thus described this invention, I claim:

1. A fishing hook snapper comprising an elongated shell member, a sleeve member slidably disposed in said shell member, a plunger slidably disposed in said sleeve member, means for yieldably urging said sleeve member forwardly relative to said shell, means for yieldably urging said plunger forwardly relative to said sleeve, said plunger having its rearward end protruding through the rearward end of said shell, said shell and sleeve having complementary engageable means in association with said plunger for holding said plunger in a given protracted position relative to said shell, whereby said means disengages under the action of said yieldable means when said plunger is protracted beyond the given position.

2. A fishing hook snapper comprising an elongated shell member, a sleeve member slidably disposed in said shell member, a plunger slidably disposed in said sleeve member, means yieldably urging said plunger forwardly relative to said sleeve, said plunger having its rearward end protruding through the rearward end of said shell, said sleeve having a forwardly facing shoulder, said shell having a rearwardly facing seat adapted to engage said shoulder when said sleeve is in a protracted position, said plunger having means for maintaining said shoulder in engagement with said seat when said plunger is in a given protracted position, whereby said shoulder is disengaged from said seat under the action of said yieldable means when said plunger is protracted beyond the given position.

3. A fishing hook snapper comprising an elongated shell member, a sleeve member slidably disposed in said shell member, a plunger slidably disposed in said sleeve member, means yieldably urging said sleeve member forwardly relative to said shell member, means yieldably urging said plunger forwardly relative to said sleeve, said plunger having its rearward end protruding through the rearward end of said shell, said sleeve having one end thereof radially resilient, said resilient end having a forwardly facing shoulder, said shell having a rearwardly facing seat adapted to engage said shoulder when said sleeve is in a protracted position, said plunger having a rearward enlarged section adapted to hold said radially resilient end outward when in a given protracted position and thereby maintain said shoulder in engagement with said seat and a reduced section forward of said enlarged section, whereby when said plunger is protracted beyond the given position, it releases said resilient end and said shoulder becomes disengaged from said seat under the action of said yieldable means.

4. A fishing hook snapper comprising an elongated shell member, a sleeve member slidably disposed in said shell member, a plunger slidably disposed in said sleeve member, prongs on one end of said sleeve member, said plunger having a rearward enlarged section and a forward reduced section, forwardly facing shoulders on said prongs, a rearwardly facing seat on said shell member adapted to engage said shoulders when said sleeve is in a protracted position, the enlarged section of said plunger being adapted to maintain said prongs outwardly and thereby hold said shoulders in engagement with said seat, and means for retracting said sleeve member when said enlarged section is disengaged from said prongs.

5. A fishing hook snapper comprising a shell member and a plunger slidably disposed within said shell member and protruding through one end of the shell, means for attaching a fishing hook to the protruding end of the plunger, means for attaching a fishing line to the opposite end of the shell member, and means within the shell for holding said plunger in a given protracted position relative to said shell and for retracting it when a force is applied to it outwardly relative to the shell.

6. A fishing hook snapper as defined by claim 4 wherein the shell is provided with a longitudinal slot and the sleeve member is provided with a finger extending radially through the slot.

SIMON EUZENT.

REFERENCES CITED

The following references are of record in the file of this patent:

UNITED STATES PATENTS

| Number | Name | Date |
|---|---|---|
| 1,803,561 | Rodin | May 5, 1931 |
| 2,147,917 | Noren | Feb. 21, 1939 |

FOREIGN PATENTS

| Number | Country | Date |
|---|---|---|
| 710,595 | France | June 9, 1931 |